United States Patent [19]
Johnson et al.

[11] Patent Number: 5,425,962
[45] Date of Patent: Jun. 20, 1995

[54] METHOD FOR REFINING MINT OILS AND CHEWING GUM MADE FROM SAME

[75] Inventors: Sonya S. Johnson, Brookfield; Michael J. Greenberg, Northbrook, both of Ill.

[73] Assignee: Wm. Wrigley Jr. Company, Chicago, Ill.

[21] Appl. No.: 242,720

[22] Filed: May 13, 1994

[51] Int. Cl.⁶ .......................... C11B 9/02; A23G 3/30
[52] U.S. Cl. .......................... 426/3; 426/651; 426/487; 426/492; 426/494
[58] Field of Search .......................... 426/3–6, 426/650, 651, 487, 492, 494

[56] References Cited

U.S. PATENT DOCUMENTS

| | | | |
|---|---|---|---|
| 4,613,513 | 9/1986 | Hussein | 426/651 |
| 4,708,880 | 11/1987 | Hussein | 426/424 |
| 4,889,726 | 12/1989 | Dave et al. | 426/3 |
| 4,948,595 | 8/1990 | Patel et al. | 426/3 |
| 4,980,169 | 12/1990 | Oppenheimer et al. | 426/439 |
| 5,030,459 | 7/1991 | Barcelon et al. | 426/651 |
| 5,041,294 | 8/1991 | Patel | 426/3 |
| 5,116,625 | 5/1992 | Patel | 426/651 |
| 5,128,154 | 7/1992 | Johnson et al. | 426/3 |
| 5,204,128 | 4/1993 | Johnson | 426/651 |
| 5,286,500 | 2/1994 | Synosky et al. | 426/3 |
| 5,372,824 | 12/1994 | Record et al. | 426/651 |

FOREIGN PATENT DOCUMENTS

| | | |
|---|---|---|
| 1212360 | 11/1970 | United Kingdom . |
| WO90/00547 | 1/1990 | . |
| WO90/06689 | 6/1990 | . |

*Primary Examiner*—Jeanette Hunter
*Attorney, Agent, or Firm*—Hill, Steadman & Simpson

[57] ABSTRACT

The present invention provides a method for refining peppermint oil containing compositions. Additionally, the present invention provides a method for making chewing gum having a peppermint flavor. To this end, a method for refining a peppermint oil containing composition that includes sulfur compounds to remove at least a portion of the sulfur compounds is provided. The method comprises the step of subjecting the composition to a distillation process that removes at least a portion of the sulfur compounds from the composition, but does not remove more than 3% of the total composition.

33 Claims, No Drawings

METHOD FOR REFINING MINT OILS AND CHEWING GUM MADE FROM SAME

BACKGROUND OF THE INVENTION

The present invention relates generally to mint flavors. More specifically, the present invention relates to methods for refining mint flavors and using same in chewing gum.

It is known in the chewing gum industry to add mint flavoring to chewing gum. For example, it is known to add peppermint oil to chewing gum. In addition to adding desirable taste characteristics to the chewing gum, such mint flavoring can add perceived breath freshening properties.

A number of mint flavored chewing gums, however, have a tendency to produce bitter flavor notes in the latter part of a chew. This is due, in part, to the fact that most, if not all, of the sweetness properties have been dissipated. This causes more of the mint flavor to become apparent, as well as the bitterness.

One method for reducing bitterness is disclosed in U.S. patent application Ser. No. 08/037,037 filed Mar. 25, 1993 and entitled: "MINT FLAVORED CHEWING GUM HAVING REDUCED BITTERNESS AND METHODS FOR MAKING SAME." In that application, a method is provided for producing mint flavored chewing gums having reduced bitterness. In part, that application discloses a chewing gum including a water insoluble base portion, a water soluble portion, and a mint flavor agent from which at least a portion of l-menthol has been removed.

Other patents and patent applications have considered modifying the formulation of chewing gum to deal with the undesirable properties of mint flavoring. These patents and published PCT patent applications include: U.S. Pat. Nos. 4,948,595; 4,889,726; 5,041,294; 5,128,154; 4,708,880; 4,980,169; 4,613,513; PCT 90-006689; and PCT 91-00547.

Another issue raised by mint flavor oils, such as peppermint oil, is that initially they typically include sulfur containing compounds such as dimethyl sulfide. In attempting to create a more palatable peppermint oil, usually, peppermint oil compositions are distilled to remove dimethyl sulfide and other sulfur compounds. Typically, distillations of peppermint oil are performed by steam distillation. However, such distillation processes are not entirely satisfactory.

The typical steam distillation process in addition to removing sulfur containing components also removes desirable low boiling point peppermint oil components. For example, 3-methylbutanal is a desirable component of most peppermint flavors; 3-methylbutanal imparts creamy, chocolate notes to the flavor. Due to its low boiling point, steam distillation also removes 3-methylbutanal in addition to other desirable components. It is therefore necessary for the manufacturer when refining peppermint oil to separate these desirable low boiling peppermint oil components from the distillate and add them back to the flavor. This increases the cost and time of the distillation process.

An additional problem with most currently used methods of refining peppermint oil is that they may subject the peppermint oil to excessive heat history. This can produce undesirable changes in the flavor; for example, excessive distillation can create still notes.

Further, steam distillation leaves substantial quantities of water in the flavor. This water must be removed. This adds a further step to the distillation process.

There is therefore a need for an improved method for refining peppermint oil.

SUMMARY OF THE INVENTION

The present invention provides an improved method for refining peppermint oil containing compositions. Additionally, the present invention provides an improved method for making chewing gum having a peppermint flavor.

To this end, a method for refining a peppermint oil containing composition that includes sulfur compounds to remove at least a portion of the sulfur compounds is provided. The method comprises the step of subjecting the composition to a distillation process that removes at least a portion of the sulfur compounds from the composition, but does not remove more than 3% of the total composition.

In an embodiment, the composition consists essentially of peppermint oil.

In an embodiment, more than 0.25% of the composition is removed by the distillation process.

In a further embodiment, the pressure during the vacuum distillation process is reduced to no more than 150 mmHg.

In a further embodiment, the temperature of the composition during the distillation process does not exceed 120° C.

In an embodiment, after the distillation process, the composition includes not more than 75 ppm dimethyl sulfide.

In an embodiment, the method includes the step of measuring dimethyl sulfide in the composition during the distillation process and terminating the process when the dimethyl sulfide content in the composition is less than 75 ppm.

In an embodiment, the method includes the step of agitating a distillation pot including the composition during the distillation process.

In an embodiment, the method includes the step of blanketing a distillation pot including the composition with an inert gas during the distillation process.

In an embodiment, the level of 3-methylbutanal in the composition after distillation is not reduced below 100 ppm.

The present invention also provides a method for creating a peppermint flavor chewing gum comprising the steps of adding to an insoluble gum base portion and a water soluble portion a peppermint oil that has been refined by subjecting a peppermint oil containing composition to a vacuum distillation process for a sufficient time and at sufficient parameters to achieve an at least approximately 97% yield of refined peppermint oil that has a dimethyl sulfide content of less than 75 ppm.

In an embodiment, the present invention provides a method for refining peppermint oil comprising the steps of subjecting a peppermint oil containing composition to a vacuum distillation process wherein the pressure is reduced to less than or equal to 150 mmHg and the composition is not subjected to a temperature greater than 120° C. and removing during the process sufficient dimethyl sulfide that may be present to provide a refined peppermint oil having a dimethyl sulfide content of less than 75 ppm.

An advantage of the present invention is that it provides an improved method for refining mint oil, such as peppermint oil.

Another advantage of the present invention is that it provides a method for providing refined peppermint oil for use in creating chewing gum.

Furthermore, an advantage of the present invention is that it provides a method for creating mint flavored chewing gum.

Still further, an advantage of the present invention is that it provides a more economical and less labor intense method for refining peppermint oil.

Further, an advantage of the present invention is that it provides a method for refining peppermint oil that provides increased yields.

Additionally, an advantage of the present invention is that it provides an improved peppermint flavored chewing gum.

Another advantage of the present invention is that it provides a distillation process for refining peppermint oil that reduces the number of steps necessary to refine the peppermint oil.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides an improved method for refining peppermint oil and peppermint oil containing compositions. Additionally, the present invention provides an improved method for making chewing gum including peppermint oil.

Pursuant to the present invention, a method is provided for refining peppermint oil and peppermint oil blends to remove sulfur compounds, as well as water, while leaving desirable low boiling point components in the undistilled fraction. Although, in an embodiment of the present invention, the peppermint oil can be used in the production of chewing gum, the present invention will have applications to the production of other mint flavored products, such as mint flavored confectionery products.

The present invention can be used to refine not only compositions that consist essentially of peppermint oil, but compositions that include a blend of peppermint oil and other flavors or mint oils. In this regard, the peppermint oil composition may include other flavors, such as spearmint oil, which may also be subjected to the process of the present invention.

Pursuant to the present invention, a method for refining peppermint oil, or peppermint oil blends, to remove sulfur components is provided comprising the step of subjecting the flavor to a distillation. Preferably, a batch vacuum distillation process is used. However, other distillation processes can be used including a continuous process vacuum distillation in which a steady state feed of field distilled oil and continuous, steady state removal of distillate and product are performed simultaneously. A spinning cone distillation can also be used in which a specialized apparatus having a series of cones spinning at high speed is used to separate the components in a continuous or batch process under vacuum or at atmospheric pressure.

Using the vacuum process, the vacuum distillation is performed at relatively low temperatures over a short period of time to remove approximately 0.25% to about 3% of the distillate. In a preferred embodiment, not more than 2% of the distillate is removed. In an embodiment, not more than 1% of the distillate is removed.

Due to the method of the present invention, the removed distillate will be composed of water and low boiling compounds including the sulfur compounds; in contrast to prior methods, e.g., steam distillation, at least a substantial portion of the desirable low boiling point peppermint oil components are not removed during the distillation process During the distillation process, a vacuum is created that reduces the pressure during the process to less than or equal to 150 mmHg. Preferably, it has been found that the pressure should be reduced to less than 100 mm and most preferably, less than 60 mmHg. However, in a most preferred embodiment, the pressure is reduced to less than or equal to 30 mmHg. In a further preferred embodiment, the pressure is reduced to less than or equal to 15 mmHg.

During the distillation process, in order to prevent degregation of the flavor components while insuring efficient distillation, the temperature of the oil being distilled should not exceed approximately 120° C. Preferably, the temperature of the oil will not exceed approximately 90° C. for any extended period of time. However, it should be noted that it is acceptable for the temperature to briefly, e.g., less than approximately 20% of the total distillation time, exceed these temperatures before cooling procedures are initiated to prevent thermal degregation.

It is believed that only minimum separation effectiveness is necessary to practice the vacuum distillation of the present invention. It is possible that fractionating columns or other apparatuses having only one theoretical plate or less could be effective. Of course, columns with more theoretical plates can also be used.

The distillation pot containing the oil to be refined should be agitated during the process. This will prevent degregation that can be caused by uneven heating and other problems. A number of means can be used for agitating the distillation pot. Such means include using mechanically or magnetically driven impellers or bubbling inert gas into the oil. Other means, however, can also be used.

In an embodiment, to reduce oxidation which can occur during the distillation process, the distillation pot can be blanketed with an inert gas, such as nitrogen. This is especially useful when the vessel is repressurized after completing the distillation.

In performing the process of the present invention using stills having an adjustable reflux apparatus, the reflux setting will be determined by the characteristics of the distillation apparatus used. With some equipment, it may be desirable to set the reflux to a high return ratio until the desired starting temperature and pressure are reached. However, the apparatus will normally be set to a high collection ratio once the distillation process begins.

As previously noted, typically, dimethyl sulfide is present in peppermint oil at levels from 100 to 1,000 ppm (parts per million by weight). Pursuant to the present invention, the vacuum distillation process is run until the undistilled portion includes less than 75 ppm of dimethyl sulfide. Preferably, the refined peppermint oil includes less than 40 ppm of dimethyl sulfide. In a most preferred embodiment, the present invention is able to provide refined peppermint oil having less than or equal to 10 ppm by weight dimethyl sulfide.

It has been determined, through sensory testing, that peppermint oil having levels of dimethyl sulfide greater than 75 ppm are negatively perceived by experienced judges as compared to peppermint oil having less than 75 ppm dimethyl sulfide. On the other hand, however, extending the distillation point so that excessive distillation is preformed can reduce the yield and remove excessive quantities of desirable low boiling point components.

For example, as noted above, one desirable constituent that imparts creamy, chocolate notes to the peppermint flavor is 3-methylbutanal. This compound normally occurs in peppermint oil, prior to any refining process, at levels of approximately 400 to about 1,000 ppm by weight. The distillation process of the present invention should not reduce the level of this component below 100 ppm and preferably, not below 200 ppm. Indeed, it has been found that the method of the present invention can create refined peppermint oil including 3-methylbutanal at a level of 250 ppm or greater.

To determine the end point of the distillation process, a variety of methods can be used. One method is to use a sulfur detector in the distillation pot to directly measure dimethyl sulfide levels. The distillation process is then manually or automatically shut down when the desired reduction in dimethyl sulfide is reached.

If desired, a number of trial distillations can be used to determine how much distillate should be collected in the receiver to achieve the desired reduction of dimethyl sulfide while maintaining high levels of 3-methylbutanal. The amount of distillate that must be collected will probably vary with the design and scale of the equipment used, as well as the initial dimethyl sulfide level and to a lesser extent, the amount of water in the undistilled flavor. It may also desirable to establish a steady state condition in the still by running at least one or two batches to wet the initial surfaces of the distillation apparatus. In general, the amount of distillate to be collected will be approximately 0.25 to 3% of the undistilled oil.

Pursuant to the present invention, a good quality peppermint oil will yield 97 to 99.75 refined oil in a steady state batch process. In addition to the distillate removed, losses may include material loss to the vacuum pump and trap and other equipment areas. Additionally, in the first batch or two, material used to wet the internal surfaces of the distillation apparatus will also be loss. Of the 0.25 to 3% loss during the distillation process, approximately 10 to 90% will be water typically resulting in a net dry yield of approximately 98 to 99.9%.

By way of example, and not limitation, an example of a distillation process will now be given:

EXAMPLE

A nominal 600 pound vacuum still equipped with a still pot was used. The pot was glass lined and jacketed for steam heating and tap water cooling. A mechanically driven impeller for agitation was located in the pot. An eight inch diameter by 4.5 feet long fractionating column packed with stainless steel Heliapack ® which has 4 to 6 theoretical plates of separation at full equilibration was also used, as well as an adjustable reflux apparatus.

400 pounds of blended field distilled peppermint oil was used in the following process. The oil was analytically determined to contain 1.33% water giving a dry basis weight of 394.7 pounds.

Several similar distillations were conducted to bring the still to an equilibrium condition. The process then proceeded as follows at the following time intervals.

Zero time: the peppermint oil was charged into the pot which was at 8 mm absolute pressure; oil temperature 29° C.; vapor temperature 20° C.; reflux set to 100%; steam on full.

5 min: a slight drip was noted in the reflux sight glass; reflux switched to 100% collect; oil temperature 31° C.; vapor temperature 20° C.; vacuum 7–8 mm.

10 min: oil temperature 41° C.; vapor temperature 20° C.; vacuum 11 mm; 0.9 pounds collected.

14 min: oil temperature 46° C.; vapor temperature 20° C.; vacuum 11 mm; 1.8 pounds collected.

17 min: oil temperature 51° C.; vapor temperature 20° C.; vacuum 11 mm; 2.7 pounds collected.

20 min: oil temperature 56° C.; vapor temperature 20° C.; vacuum 11 mm; 3.2 pounds collected.

23 min: Steam pressure decreased to just slightly on; oil temperature 63° C.; vapor temperature 20° C.; vacuum 9 mm; 3.7 pounds collected.

27 min: Steam off; oil temperature 67° C.; vapor temperature 20° C.; vacuum 8 mm; 3.9 pounds collected.

30 min: oil temperature 72° C.; vapor temperature 20° C.; vacuum 6 mm; 4.0 pounds collected.

32 min: Cooling water turned on, receiver drained; oil temperature 75° C.; vapor temperature 20° C.; vacuum 8 mm; 4.0 pounds drained.

41 min: Reflux switched to 100% return; oil temperature 77° C.; vapor temperature 20° C.; vacuum 8 mm; slight additional amount collected.

47 min: approximately 3 oz. of liquid drained from collector; oil temperature 72° C.; vapor temperature 20° C.; vacuum 7 mm.

50 min: oil temperature 68° C.; vapor temperature 20° C.; vacuum 7 mm.

55 min: oil temperature 66° C.; vapor temperature 20° C.; vacuum 8 mm.

The oil remaining in the pot was cooled to 37° C. and pumped into a clean drum. The recovered oil was weighed at 392 pounds, a 98% gross recovery. The oil was analytically determined to contain 0.38% water indicating a dry basis weight of 390.5 pounds and a dry basis recovery of 98.94%. It is believed that the yield could be improved by at least 0.5% on a full scale process.

The above yield compares with a typical 98.5% yield for a full scale prior art steam distillation process that includes a second distillation of the distillate with a fraction added back to the finished product. However, the prior art process is more complex, time consuming, and less energy efficient than the method of the present invention. Thus, the prior art process is much more expensive to operate especially when the lower yield is factored in.

The distillate which was discarded, contained two layers (oil/water) which were both clear liquids very pale yellow to water-white in color.

Pursuant to the present invention, the refined peppermint oil can be used to create chewing gum. In this regard, the present invention also provides a mint flavor chewing gum comprising a water insoluble base portion, a water soluble base portion, and a mint flavor agent refined pursuant to the present invention. The chewing gum may be any of a variety of different chewing gums, including low or high moisture, sugar or sugarless, wax-containing or wax-free, low calorie and/or a chewing gum that includes dental health agents.

Chewing gum generally consists of a water insoluble gum base, a water soluble portion, and flavors. The water soluble portion dissipates with a portion of the flavor over a period of time during chewing. The gum base portion is retained in the mouth throughout the chew.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum base of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with a GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is abhesive or conventional, bubble gum or regular gum, as discussed below. Preferred natural elastomers include jelutong, chicle, sorva and massaranduba balata.

Elastomer plasticizers may include, but are not limited to, natural rosin esters such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5 to about 15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sugarless sweeteners include, but are not limited to, sugar alcohols such as sorbitol, mannitol, xylitol, hydrogenated starch hydrolysates, maltitol, and the like, alone or in combination.

High intensity artificial sweeteners can also be used, alone or in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin;Fructooligosaccharides (NutraFlora);Palatinose oligosaccharide; Guar Gum Hydrolysate (Sun Fiber); or indigestible dextrin (Fibersol). However, other low calorie bulking agents can be used.

A variety of flavoring agents can be used in combination with the refined mint flavor of the present invention. The flavor, which may only include the refined mint flavor, can be used in amounts of approximately 0.1 to about 15 weight percent of the gum, and preferably, 0.3 to 5%. Flavoring agents may include essential oils, synthetic flavors or mixtures thereof including, but not limited to, oils derived from plants and fruits. In addition to peppermint oil, mint oils include spearmint oil, as well as other mint oils. Artificial flavoring agents and components may also be used. Natural and artificial flavoring agents may be combined in any sensorially acceptable fashion.

COMPARATIVE EXAMPLE

Sensory testing of refined oils prepared according to the process of the present invention demonstrated that they are equal to, or better than, peppermint oils refined by less efficient, more expensive prior art distillation processes.

The refined peppermint oil of the present invention, prepared pursuant to the method of the above example, was compared to the same oil which was steam distilled according to the prior art practice. To this end, sweet water solutions (comprising 5% sucrose and ethanol as a cosolvent) containing the refined peppermint oils were evaluated by six trained panelists who individually made the following comments on the samples:

Comparative sample

Clean peppermint aroma. Distinct peppermint, creamy, sweet, more minty "top" notes than "deep" character. Cooling.

Present Invention Sample

"Greener" peppermint aroma. Less "green" peppermint top notes, more "Deep" characters, some chocolate notes. Panelists commented that this sample has more of the deeper distinctly "Doublemint" character.

The two oils were then compounded into identical sugarless chewing gums which were again evaluated by trained panelists with the following results:

Comparative Sample

The sample containing the comparative flavor was sharp and biting in flavor from the initial chew. The flavor was considered high in menthol and cooling along with the peppermint. At one minute, the sweetness increased taking the edge off the flavor although the flavor remained high in cooling and sharpness with biting flavor sensation.

Present Invention Sample

The sample with the flavor refined pursuant to the present invention was definitely different in flavor character compared to the control. There were more creamy notes to the flavor and the flavor was not as sharp or biting in the early chew. This flavor was considered slightly less clean as compared to the comparative sample. This sample also seemed to have slightly lower flavor initially.

The two oils were also compared in a sugar gum formulation:

There were differences between these samples although both are acceptable in sensory character. The sample containing the flavor refined pursuant to the method of the present invention was perceived as heavier with more caramel and buttery notes. There were fewer distinct chocolate notes. It was considered less clean with fewer peppermint patty like notes. The final peppermint character was perceived as less crisp and cooling.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method for refining a peppermint oil containing composition that includes sulfur compounds to remove at least a portion of the sulfur compounds comprising the step of:
    subjecting the composition to a single distillation process that removes at least a portion of the sulfur compounds but not more than 3% of the composition.

2. The method of claim 1 wherein the composition consists essentially of peppermint oil.

3. The method of claim 1 wherein more than 0.25% of the composition is removed by the distillation process.

4. The method of claim 1 wherein the composition is subjected to a vacuum distillation process.

5. The method of claim 4 wherein the pressure during the vacuum distillation process is reduced to less than or equal to 150 mmHg.

6. The method of claim 4 wherein the pressure during the vacuum distillation process is reduced to less than or equal to 60 mmHg.

7. The method of claim 4 wherein the pressure during the vacuum distillation process is reduced to less than or equal to 30 mmHg.

8. The method of claim 4 wherein the pressure during the vacuum distillation process is reduced to less than or equal to 15 mmHg.

9. The method of claim 1 wherein the temperature of the composition during the distillation process does not exceed 90° C.

10. The method of claim 1 wherein after the distillation process, the composition includes not more than 75 ppm dimethyl sulfide.

11. The method of claim 1 wherein after the distillation process, the composition includes not more than 10 ppm dimethyl sulfide.

12. The method of claim 1 including the step of measuring dimethyl sulfide in the composition during the distillation process and terminating the process when the dimethyl sulfide content in the composition is less than 40 ppm.

13. The method of claim 1 including the step of agitating a distillation pot including the composition during the distillation process.

14. The method of claim 1 including the step of blanketing a distillation pot including the composition with an inert gas during the distillation process.

15. The method of claim 1 including the step of using during the distillation process a fractionating column including at least one theoretical plate.

16. The method of claim 1 wherein the level of 3-methylbutanal in the composition after the distillation process is not reduced below 100 ppm.

17. The method of claim 1 wherein the level of 3-methylbutanal in the composition after the distillation process is not reduced below 250 ppm.

18. The method of claim 1 wherein the composition is subjected to a batch vacuum distillation process.

19. The method of claim 1 wherein the composition is subjected to a continuous process vacuum distillation.

20. The method of claim 1 wherein the composition is subjected to a spinning cone distillation.

21. A method for creating a peppermint flavor chewing gum comprising the steps of:

adding to an insoluble gum base portion and a water soluble portion a peppermint oil that has been refined by subjecting a peppermint oil containing composition to a single vacuum distillation process for a sufficient time and at sufficient parameters to achieve an at least approximately 97% yield of refined peppermint oil having a dimethyl sulfide content of less than 75 ppm.

22. The method of claim 21 wherein the composition consists essentially of peppermint oil.

23. The method of claim 21 wherein the pressure during the vacuum distillation process is reduced to less than or equal to 150 mmHg.

24. The method of claim 21 wherein the temperature of the composition during the distillation process does not exceed 120° C.

25. The method of claim 21 wherein the level of 3-methylbutanal in the composition after distillation is not reduced below 100 ppm.

26. The method of claim 21 wherein the level of 3-methylbutanal in the composition after the distillation process is not reduced below 250 ppm.

27. The method of claim 21 wherein after the distillation process, the composition includes not more than 10 ppm dimethyl sulfide.

28. The method of claim 21 wherein after the distillation process, the composition includes not more than 40 ppm dimethyl sulfide.

29. A method for refining peppermint oil comprising the steps of:

subjecting a peppermint oil containing composition to a vacuum distillation process wherein the pressure is reduced to less than or equal to 150 mmHg and the composition is not subjected to a temperature of greater than 120° C. and removing during the process sufficient dimethyl sulfide that may be present to provide a refined peppermint oil having a dimethyl sulfide content of less than 75 ppm.

30. The method of claim 29 wherein not more than 3% of the distillate is removed.

31. The method of claim 29 wherein not more than 2% of the distillate is removed.

32. The method of claim 29 wherein not more than 1% of the distillate is removed.

33. The method of claim 29 wherein the level of 3-methylbutanal in the composition after the distillation is equal to or greater than 100 ppm.

* * * * *